United States Patent
Mitsuhara

(10) Patent No.: US 7,363,134 B2
(45) Date of Patent: Apr. 22, 2008

(54) POWER STEERING APPARATUS

(75) Inventor: Takashi Mitsuhara, Nara (JP)

(73) Assignees: Favess Co. Ltd., Aichi (JP); Koyo Seiko Co., Ltd., Osaka (JP); Toyoda Koki Kabushiki Kaisha, Aichi (JP)

( * ) Notice: Subject to any disclaimer, the term of this patent is extended or adjusted under 35 U.S.C. 154(b) by 327 days.

(21) Appl. No.: 11/141,930

(22) Filed: May 31, 2005

(65) Prior Publication Data

US 2006/0015230 A1   Jan. 19, 2006

(30) Foreign Application Priority Data

Jun. 1, 2004   (JP) .............................. 2004-163733

(51) Int. Cl.
B62D 11/00 (2006.01)
(52) U.S. Cl. ........................ 701/42; 180/146
(58) Field of Classification Search ............... None
See application file for complete search history.

(56) References Cited

U.S. PATENT DOCUMENTS

| | | | | |
|---|---|---|---|---|
| 4,392,540 | A | * | 7/1983 | Michio et al. ............... 180/422 |
| 5,749,431 | A | * | 5/1998 | Peterson ....................... 180/422 |
| 6,101,435 | A | * | 8/2000 | Baughn et al. ............... 701/41 |
| 6,305,489 | B1 | | 10/2001 | Kariatsumari |
| 6,988,581 | B2 | * | 1/2006 | Croughs et al. ............ 180/442 |
| 7,164,978 | B2 | * | 1/2007 | Takaki et al. .................. 701/41 |
| 2002/0005314 | A1 | * | 1/2002 | Takehara et al. ............. 180/443 |
| 2003/0024758 | A1 | * | 2/2003 | Fujita ......................... 180/422 |

FOREIGN PATENT DOCUMENTS

| | | |
|---|---|---|
| EP | 0893328 | 1/1999 |
| EP | 1 000 836 A2 | 5/2000 |
| EP | 1016583 | 7/2000 |
| EP | 1283147 | 2/2003 |
| EP | 1413497 | 4/2004 |
| GB | 2 233 293 A | 1/1991 |
| JP | 2-40546 B2 | 9/1990 |
| JP | 3-32980 A | 2/1991 |
| JP | 2000-142436 A | 5/2000 |
| JP | 2001-88725 A | 4/2001 |

OTHER PUBLICATIONS

Patent Abstracts of Japan for 2001-088725 Published on Apr. 3, 2001.
Patent Abstracts of Japan for 59-011968 (2-40546) Published on Jan. 21, 1984.
Patent Abstracts of Japan for 03-032980 Published on Feb. 13, 1991.
Patent Abstracts of Japan for 2000-142436 Published on May 23, 2000.

* cited by examiner

Primary Examiner—Michael J. Zanelli
(74) Attorney, Agent, or Firm—Darby & Darby P.C.

(57) ABSTRACT

A power steering apparatus according to the present invention is constructed to calculate a rate of change of steering speed detected by steering speed detecting means and judge whether the calculated rate of change is smaller than or equal to 0 or not, and reduce a gain of feedback control in comparison with a gain at the time of judgment when it is judged that the rate of change remains smaller than or equal to 0 for a predetermined time period and keep the reduced gain of feedback control until the deviation between target rotational speed and actual rotational speed of an electric motor becomes larger than 0.

4 Claims, 15 Drawing Sheets

POWER STEERING APPARATUS

CROSS-REFERENCE TO RELATED APPLICATIONS

This Nonprovisional application claims priority under 35 U.S.C. §119(a) on patent application Ser.No. 2004-163733 filed in Japan on Jun. 1, 2004, the entire contents of which are hereby incorporated by reference.

BACKGROUND OF THE INVENTION

1. Field of the Invention

The present invention relates to a power steering apparatus for controlling rotation of an electric motor using rotational speed based on vehicle speed and steering speed to assist steering with oil pressure generated by an oil pump which is driven by the electric motor.

2. Description of Related Art

Recently, a hydraulic power steering apparatus for supplying a power cylinder connected to a steering mechanism of a vehicle with hydraulic fluid from an oil pump which is driven by an electric motor to generate steering assistance force from the power cylinder has become widely used. Such a power steering apparatus is designed to determine indicated rotational speed, which is to be given to the electric motor, in accordance with a motor rotational speed map as shown in FIG. 4, which is defined by the steering speed and the vehicle speed, in order to obtain an optimal steering assistance force.

When short-time steering (rapid steering) at extremely high speed is applied to a conventional power steering apparatus constructed as described above, the indicated rotational speed to be given to the electric motor once reaches a peak value in accordance with the motor rotational speed map and then immediately decreases since the increase of the steering torque causes lowering of the steering speed. As a result, there is a problem that the flow rate of the hydraulic fluid runs short in such steering condition and the user feels an obstruction against his steering.

Although the shortage in the flow rate of the hydraulic fluid is solved by increasing the slope of rotational speed/ steering speed so that high rotational speed is obtained even with low steering speed, there is a problem that the steering assistance force changes rapidly in such a method and the smoothness of the steering force deteriorates.

Described in Japanese Patent Application Laid-Open No. 2001-88725 is a control method of an electric power steering apparatus for reducing the feeling of an omission of steering force at low speed run to come close to the advantage of a hydraulic power steering apparatus.

Described in Japanese Patent Application Examined No. 2-40546 (1990) is an electric power steering apparatus for increasing a rotational output of an oil pump from a low speed base rotational line to a vehicle sensitive base rotational line, in response to steering when the vehicle is at a stop or at vehicle speed lower than or equal to preset low speed, or regardless of steering when the vehicle speed exceeds the preset low speed.

Described in Japanese Patent Application Laid-Open No. 3-32980 (1991) is a vehicle power steering system having a simple structure and shortening the response time extremely, wherein the system can be activated with little energy and exothermic of the electric motor can be decreased, by switching an electric motor off or into a standby mode in accordance with the vehicle speed.

Described in Japanese Patent Application Laid-Open No. 2000-142436 is a power steering apparatus by which constant steering feeling can be obtained even at the time of acceleration and deceleration.

BRIEF SUMMARY OF THE INVENTION

The present invention has been made with the aim of solving the above problems, and it is an object thereof to provide a power steering apparatus with which no feeling of an obstruction is generated in rapid steering and the steering force changes smoothly.

A power steering apparatus according to the first aspect of the present invention is a power steering apparatus, which comprises: an oil pump; an electric motor for driving the oil pump; vehicle speed detecting means for detecting speed of a vehicle; steering speed detecting means for detecting steering speed of the vehicle; and rotational speed detecting means for detecting rotational speed of the electric motor, for controlling rotation of the electric motor by feedback control based on a deviation between target rotational speed based on the vehicle speed detected by the vehicle speed detecting means and on the steering speed detected by the steering speed detecting means and the rotational speed detected by the rotational speed detecting means to assist steering with oil pressure generated by the oil pump, characterized by further comprising: calculating means for calculating a rate of change of the steering speed detected by the steering speed detecting means; judging means for judging whether the rate of change calculated by the calculating means is smaller than or equal to 0 or not; and gain reducing means for reducing a gain of the feedback control in comparison with a gain at the time of judgment when the judging means judges that the rate of change remains smaller than or equal to 0 for a predetermined time period, wherein the gain reducing means is constructed to keep the reduced gain until the deviation becomes larger than 0.

In this power steering apparatus, the rotation of the electric motor is controlled by feedback control based on a deviation between target rotational speed based on vehicle speed and on steering speed and detected rotational speed to assist steering with oil pressure generated by the oil pump which is driven by the electric motor. When the rate of change of the steering speed remains smaller than or equal to 0 for a predetermined time period, the gain of the feedback control is reduced in comparison with the gain at the time and the reduced gain of the feedback control is kept until the deviation between the target rotational speed and the detected rotational speed becomes larger than 0.

A power steering apparatus according to the second aspect of the present invention is a power steering apparatus, which comprises: an oil pump; an electric motor for driving the oil pump; vehicle speed detecting means for detecting speed of a vehicle; and steering speed detecting means for detecting steering speed of the vehicle, for controlling rotation of the electric motor using target rotational speed based on the vehicle speed detected by the vehicle speed detecting means and on the steering speed detected by the steering speed detecting means to assist steering with oil pressure generated by the oil pump, characterized by further comprising: judging means for judging whether the steering speed is larger than or equal to a predetermined value or not; and holding means for holding the target rotational speed at the time of judgment when the judging means judges that the steering speed remains larger than or equal to the predetermined value for a first time period, wherein the holding means is constructed to hold the target rotational speed for a second time period which is longer than the first time period.

In this power steering apparatus, the rotation of the electric motor is controlled using target rotational speed based on vehicle speed and on steering speed to assist steering with oil pressure generated by the oil pump which is driven by the electric motor. When the steering speed remains larger than or equal to the predetermined value for the first time period, the target rotational speed of the electric motor at the time is held and this target rotational speed of the electric motor is held for the second time period which is longer than the first time period.

With a power steering apparatus according to the present invention, no feeling of an obstruction is generated in rapid steering and the steering force changes smoothly.

The above and further objects and features of the invention will more fully be apparent from the following detailed description with accompanying drawings.

DETAILED DESCRIPTION OF THE INVENTION

The following description will explain the present invention with reference to the drawings illustrating some embodiments thereof.

Embodiment 1

Figure 1:
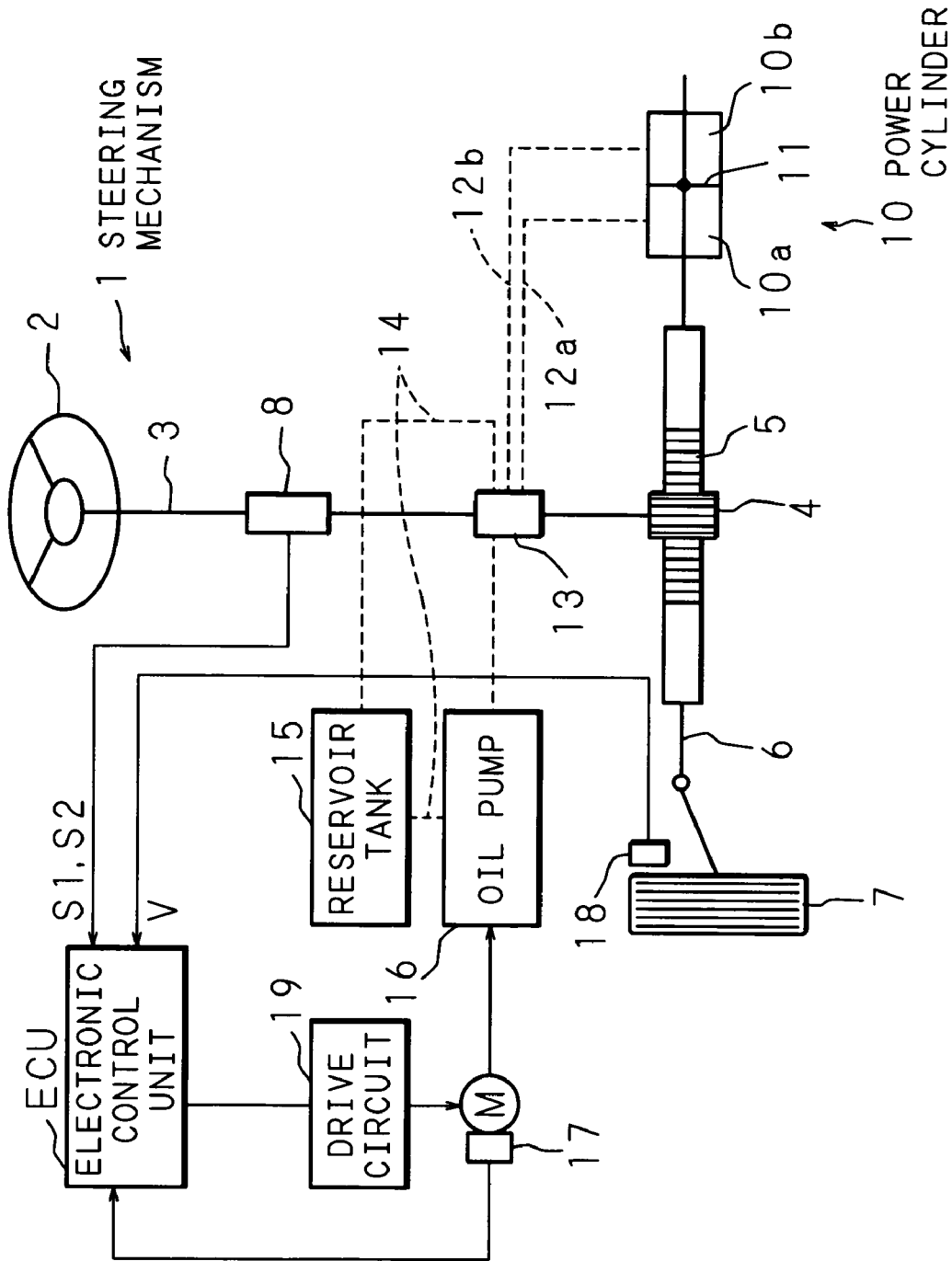
FIG. 1 is an explanatory view schematically showing the structure of a main part of an embodiment of a power steering apparatus according to the present invention.

FIG. 1 is an explanatory view schematically showing the structure of a main part of Embodiment 1 of a power steering apparatus according to the present invention. This power steering apparatus is constructed to assist steering to be performed at a steering mechanism 1 of a vehicle, in which a steering shaft 3 is connected with a steering wheel 2. Attached to a front end of the steering shaft 3 is a pinion 4, which engages with a rack shaft 5 extending in the vehicle width direction. A front wheel tire 7 is attached to the rack shaft 5 via a tie rod 6.

The rack shaft 5 is also connected with a piston 11 of a power cylinder 10, which comprises a pair of cylinder chambers 10a and 10b formed of a piston 11. The cylinder chambers 10a and 10b are connected with an oil pressure regulating valve 13 respectively through oil feed passages 12a and 12b shown in broken lines.

The oil pressure regulating valve 13 is connected at the middle of an oil circuit 14 shown in broken lines, which is formed so that hydraulic fluid reserved in a reservoir tank 15 is pumped by an oil pump 16 and the pumped hydraulic fluid is discharged from the oil pump 16 and then returned again to the reservoir tank 15.

The hydraulic fluid circulates through the oil circuit 14 when the oil pump 16 is driven by an electric motor M while the circulation of the hydraulic fluid is at a stop when the oil pump 16 is not driven.

The opening of the oil pressure regulating valve 13 is changed in accordance with the direction and the magnitude of the torque applied to the steering shaft 3 and, therefore, the state of hydraulic fluid supply to the power cylinder 10 is changed. When any one cylinder chamber of the power cylinder 10 is supplied with hydraulic fluid, the piston 11 moves in any one direction along the vehicle width direction and, therefore, steering force is generated and the movement of the rack shaft 5 is assisted.

A vehicle speed sensor 18 is constructed to detect rotational speed of a rotor of the front wheel tire 7 and may be constituted of a magnetometric sensor for detecting a magnetic metal strip fixed to the rotor, a photosensor for optically detecting a pore provided at the rotor, or the like. A vehicle speed signal V, which is a detection signal of the vehicle speed sensor 18, is given to an electronic control unit ECU.

The steering shaft 3 is provided with a steering angle sensor 8 constituted of a rotary encoder for detecting a steering angle of the steering wheel 2, and edge signals S1 and S2 of this rotary encoder are given to the electronic control unit ECU.

A rotational speed sensor 17 for detecting rotational speed (number of revolutions) of the electric motor M is attached to the electric motor M, and rotational speed detected by the rotational speed sensor 17 is given to the electronic control unit ECU.

The electronic control unit ECU determines indicated rotational speed on the basis of the given edge signals S1 and S2 and vehicle speed signal V and drives the electric motor M by controlling a drive circuit 19 of the electric motor M by feedback control on the basis of a deviation between the indicated rotational speed and rotational speed detected by the rotational speed sensor 17, to drive the oil pump 16.

In a power steering apparatus constructed as described above, when the steering wheel 2 is manipulated and the rotational force thereof is transmitted to the steering shaft 3, the pinion 4 at the front end thereof is rotated and, therefore, the rack shaft 5 moves in the vehicle width direction. As a result, the amount of movement of the rack shaft 5 is transmitted to the tie rod 6 and the orientation of the front wheel tire 7 is changed. The power cylinder 10 generates assistance force for moving the rack shaft 5 in the vehicle width direction and gives the generated assistance force to the rack shaft 5.

Figure 2:
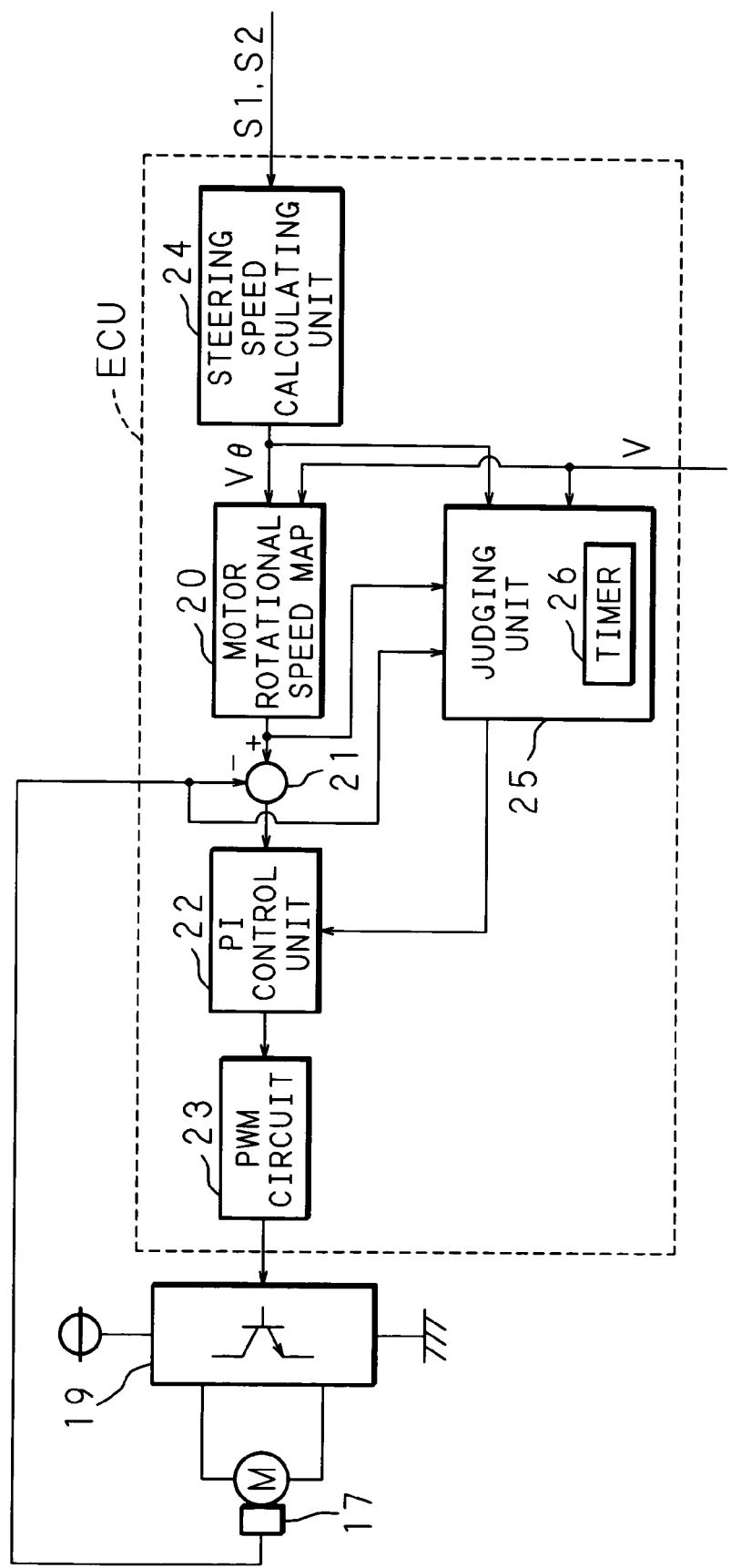
FIG. 2 is a block diagram showing an example of the structure of an electronic control unit, a drive circuit, an electric motor and a rotational speed sensor of a power steering apparatus according to the present invention.

FIG. 2 is a block diagram showing an example of the structure of the electronic control unit ECU, the drive circuit 19, the electric motor M and the rotational speed sensor 17 described above. In the electronic control unit ECU, a steering speed calculating unit 24 which is supplied with the edge signals S1 and S2 from the rotary encoder of the steering angle sensor 8 calculates steering speed on the basis of the given edge signals S1 and S2 and gives a steering speed signal $V\theta$ thereof to a motor rotational speed map 20 and a judging unit 25 (calculating means, judging means and gain reducing means). Moreover, the vehicle speed signal V from the vehicle speed sensor 18 is given to the motor rotational speed map 20 and the judging unit 25. The judging unit 25 incorporates a timer 26.

Figure 4:
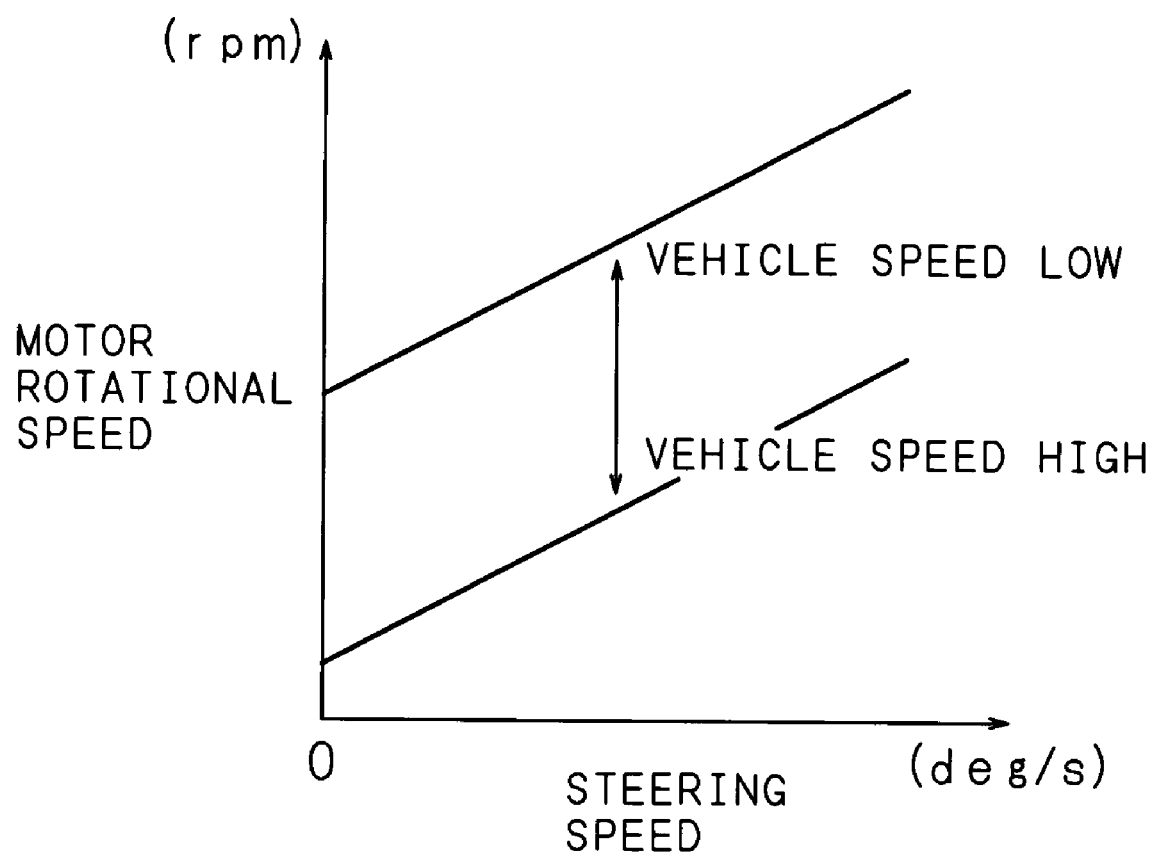
FIG. 4 is a characteristic view showing an example of a motor rotational speed map.

The motor rotational speed map 20, which has a map for defining the relation between the steering speed, the vehicle speed and the motor rotational speed as shown in FIG. 4, outputs indicated rotational speed (target rotational speed) to the electric motor M in accordance with the given steering speed signal $V\theta$ and vehicle speed signal V and gives the indicated rotational speed to a deviation computing unit 21 and the judging unit 25.

The rotational speed detected by the rotational speed sensor 17 of the electric motor M is given to the deviation computing unit 21 and the judging unit 25, and the deviation computing unit 21 subtracts the rotational speed from the indicated rotational speed to compute the deviation thereof and gives the computed deviation to a PI control unit 22.

The PI control unit 22 computes a control signal for performing PI control on the basis of the given deviation and gives the computed control signal to a PWM circuit 23. Receiving an indication signal from the judging unit 25, the PI control unit 22 switches the gain of PI control (feedback control).

The PWM circuit 23 outputs a pulse signal having a pulse width according to the given control signal to turn on/off the drive circuit 19 and drives the electric motor M.

Figure 3:
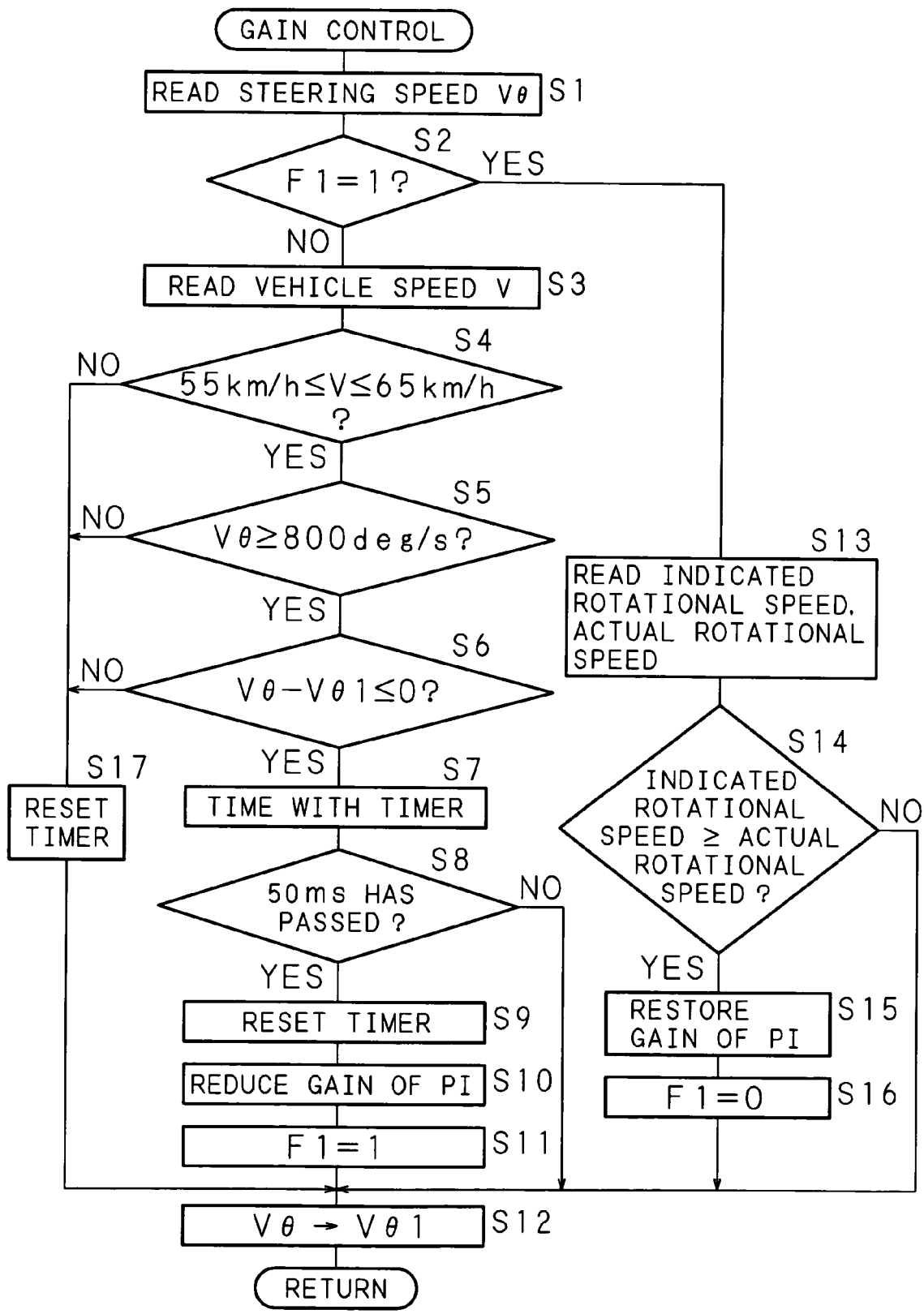
FIG. 3 is a flow chart showing an operation of controlling switchover of a gain of PI control of a power steering apparatus according to the present invention.

The following description will explain an operation of controlling switchover of a gain of PI control of a power steering apparatus constructed as described above with reference to a flow chart in FIG. 3.

The judging unit 25 first reads a steering speed (signal) $V\theta$ from the steering speed calculating unit 24 (S1) and then judges whether a flag F1 is 1 or not (S2). When the flag F1 is not 1 (F1=0), the judging unit 25 reads a vehicle speed (signal) V from the vehicle speed sensor 18 (S3) and judges whether the vehicle speed V is within a range of, for example, 55 km/h≦V≦65 km/h or not (S4).

Here, the flag and the parameters ($V\theta 1$, . . . ) used for computing are initialized during the start-up process of the power steering apparatus. (The same goes for the following flow charts in FIGS. 6, 9A, 9B, 12A and 12B.) When the vehicle speed V is within a range of 55 km/h≦V≦65 km/h (S4: YES), the judging unit 25 judges whether the steering speed $V\theta$ is, for example, larger than or equal to 800 deg/s or not (S5), and when the steering speed $V\theta$ is larger than or equal to 800 deg/s (S5: YES), the judging unit 25 judges whether a (rate of) change of the steering speed $V\theta$ from steering speed $V\theta 1$ at the time of the last sampling is smaller than or equal to 0 or not (S6). Here, only a change is computed and computation of a rate of change is omitted since it is only necessary to judge that the change is smaller than or equal to 0, that is, the steering speed is being decreased.

When the (rate of) change of the steering speed $V\theta$ is smaller than or equal to 0 (S6: YES), the judging unit 25 begins timing with the timer 26 (S7) and then judges whether 50 millisecond has passed or not (S8). When 50 millisecond has passed (S8: YES), the judging unit 25 resets the timer 26 (S9), then reduces the gain of the PI control unit 22 in comparison with a value at the time of normal operation (S10), sets the flag F1 to 1 (S11), sets the steering speed $V\theta$ to the steering speed $V\theta 1$ at the time of the last sampling (S12) and returns the procedure.

When the gain of the PI control unit 22 is reduced, the control response slows down. Accordingly, the rotational speed of the electric motor M is decreased slowly even when the steering speed lowers in rapid steering and the indicated rotational speed is decreased immediately. As a result, it is possible to avoid the flow rate of the hydraulic fluid from running short and prevent the user from feeling an obstruction against the steering wheel 2.

When the timer 26 indicates that 50 millisecond has not passed (S8: NO), the judging unit 25 sets the steering speed $V\theta$ to the steering speed $V\theta 1$ at the time of the last sampling (S12) and returns the procedure.

When the flag F1 is 1 (S2: YES), the judging unit 25 reads the indicated rotational speed from the motor rotational speed map 20 and actual rotational speed from the rotational speed sensor 17 (S13), and judges whether the actual rotational speed has lowered and become smaller than or equal to the indicated rotational speed or not (S14). When the actual rotational speed has become smaller than or equal to the indicted rotational speed (S14: YES), the judging unit 25 restores the gain of the PI control unit 22 to the value at the time of normal operation (S15), sets the flag F1 to 0 (S16), sets the steering speed $V\theta$ to the steering speed $V\theta 1$ at the time of the last sampling (S12) and returns the procedure. When the actual rotational speed has not become smaller than nor equal to the indicted rotational speed (S14: NO), the judging unit 25 sets the steering speed $V\theta$ to the steering speed $V\theta 1$ at the time of the last sampling (S12) and returns the procedure.

When the vehicle speed V is not within a range of 55 km/h≦V≦65 km/h (S4: NO), when the steering speed $V\theta$ is not larger than nor equal to 800 deg/s (S5: NO), or when the (rate of) change of the steering speed $V\theta$ from the steering speed $V\theta 1$ at the time of the last sampling is not smaller than nor equal to 0 (S6: NO), the judging unit 25 resets the timer 26 (S17), then sets the steering speed $V\theta$ to the steering speed $V\theta 1$ at the time of the last sampling (S12) and returns the procedure.

Embodiment 2

Figure 5:
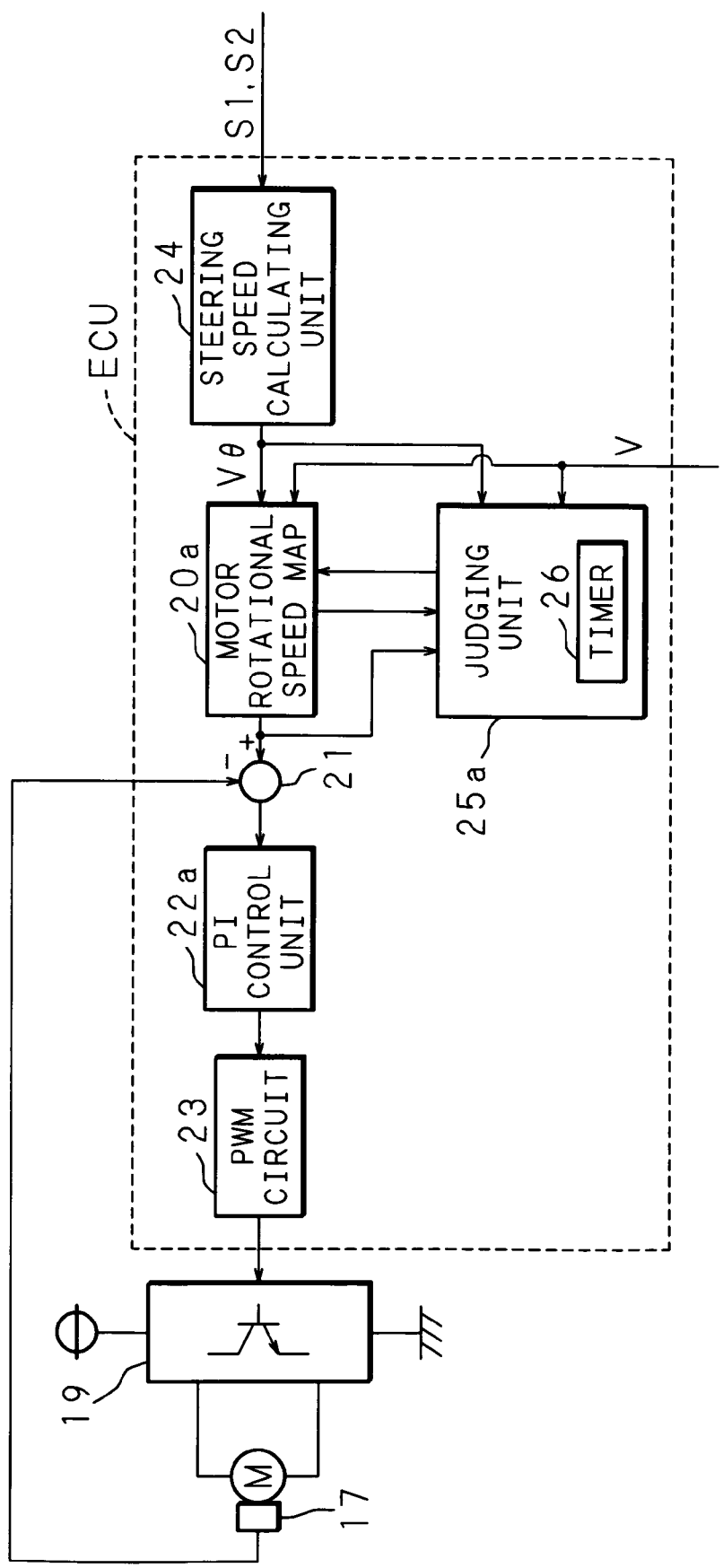
FIG. 5 is a block diagram showing an example of the structure of an electronic control unit, a drive circuit, an electric motor and a rotational speed sensor of a power steering apparatus according to the present invention.
Figure 6:
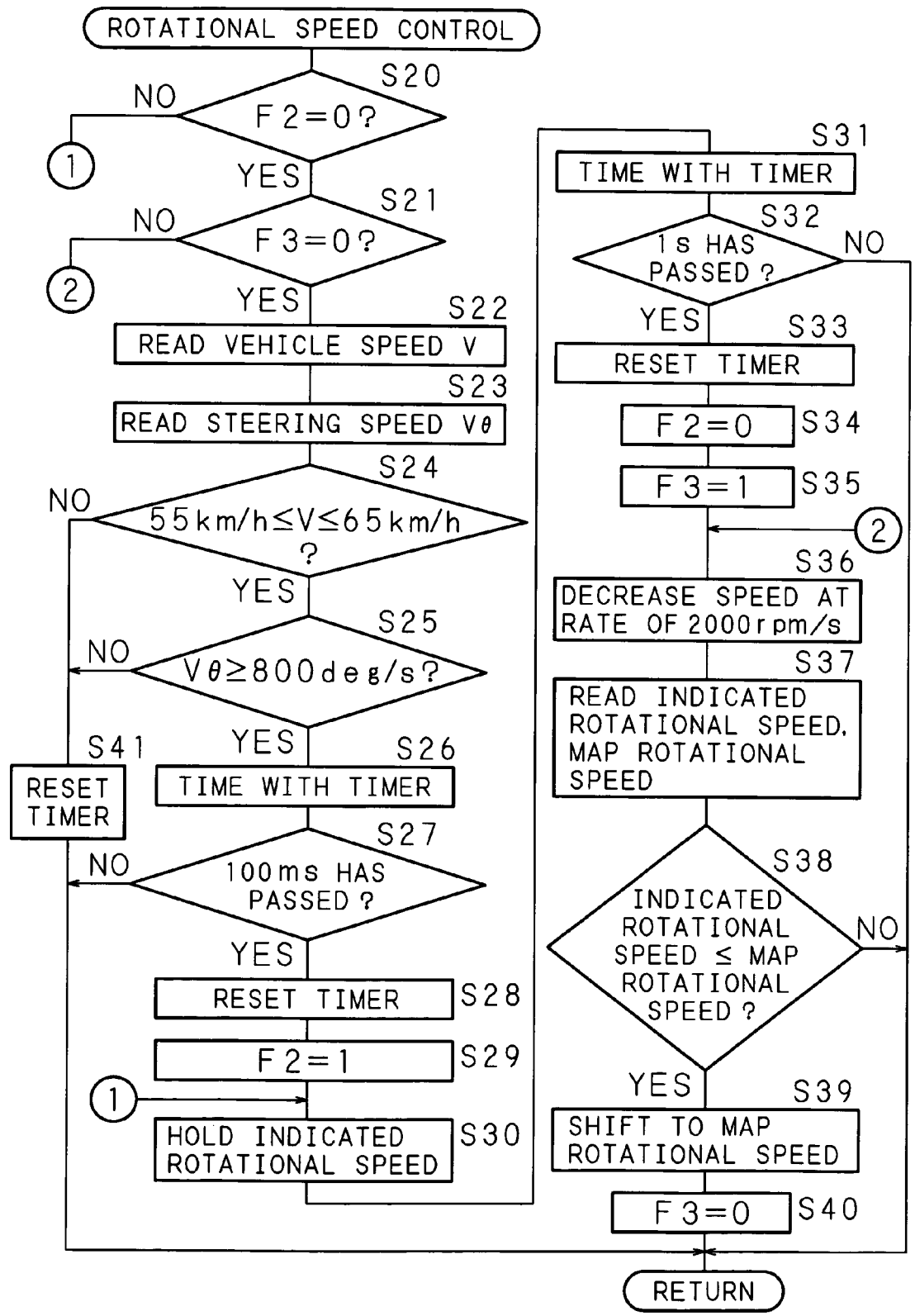
FIG. 6 is a flow chart showing an operation of controlling rotational speed of an electric motor of a power steering apparatus according to the present invention.

FIG. 5 is a block diagram showing an example of the structure of an electronic control unit, a drive circuit, an electric motor and a rotational speed sensor of Embodiment 2 of a power steering apparatus according to the present invention. In an electronic control unit ECU, a motor rotational speed map 20*a*, which has a map for defining the relation between the steering speed, the vehicle speed and the motor rotational speed as shown in FIG. 4, outputs indicated rotational speed (target rotational speed) to an electric motor M in accordance with a given steering speed signal Vθ and a given vehicle speed signal V and gives the indicated rotational speed to a deviation computing unit 21 and a judging unit 25a (judging means and holding means).

Rotational speed detected by a rotational speed sensor 17 of the electric motor M is given to the deviation computing unit 21, and the deviation computing unit 21 subtracts the rotational speed from the indicated rotational speed to compute the deviation thereof and gives the computed deviation to a PI control unit 22a.

The PI control unit 22a computes a control signal for performing PI control on the basis of the given deviation and gives the computed control signal to a PWM circuit 23. Since other structures are the same as those of Embodiment 1 (FIGS. 1 and 2) of a power steering apparatus according to the present invention described above, like codes are used to refer to like parts and the explanation thereof is omitted.

The following description will explain an operation of controlling the rotational speed of the electric motor M of a power steering apparatus constructed as described above with reference to a flow chart in FIG. 6.

The judging unit 25a first judges whether a flag F2 is 0 or not (S20), and when the flag F2 is 0 (S20: YES), the judging unit 25a judges whether a flag F3 is 0 or not (S21). When the flag F3 is 0 (S21: YES), the judging unit 25a reads a vehicle speed (signal) V from a vehicle speed sensor 18 (S22) and reads a steering speed (signal) Vθ from a steering speed calculating unit 24 (S23). The judging unit 25a then judges whether the vehicle speed V is within a range of, for example, 55 km/h≦V≦65 km/h or not (S24).

When the vehicle speed V is within a range of 55 km/h≦V≦65 km/h (S24: YES), the judging unit 25a judges whether the steering speed Vθ is, for example, larger than or equal to 800 deg/s or not (S25), and when the steering speed Vθ is larger than or equal to 800 deg/s (S25: YES), the judging unit 25a begins timing with a timer 26 (S26) and then judges whether 100 millisecond has passed or not (S27). When 100 millisecond has passed (S27: YES), the judging unit 25a resets the timer 26 (S28), then sets the flag F2 to 1 (S29), causes the motor rotational speed map 20a to hold indicated rotational speed at the time (S30) and begins timing with the timer 26 (S31).

When the motor rotational speed map 20a is caused to hold the indicated rotational speed, the rotational speed of the electric motor M is not decreased even when the steering speed lowers in rapid steering. As a result, it is possible to avoid the flow rate of the hydraulic fluid from running short and prevent the user from feeling an obstruction against the steering wheel 2.

The judging unit 25a then judges whether the timer 26 indicates that 1 second has passed or not (S32), and when 1 second has not passed (S32: NO), the judging unit 25a directly returns the procedure.

When 1 second has passed (S32: YES), the judging unit 25a resets the timer 26 (S33), then sets the flag F2 to 0 (S34), sets the flag F3 to 1 (S35) and causes the motor rotational speed map 20a to decrease the indicated rotational speed at the rate of 2000 rpm/s (S36). The judging unit 25a then reads indicated rotational speed and original map rotational speed from the motor rotational speed map 20a (S37) and judges whether the indicated rotational speed has lowered and become smaller than or equal to the map rotational speed or not (S38). When the indicated rotational speed has become smaller than or equal to the map rotational speed (S38: YES), the judging unit 25a causes the motor rotational speed map 20a to shift the indcted rotational speed so as to conform to the map rotational speed (S39), sets the flag F3 to 0 (S40) and returns the procedure. When the indicated rotational speed has not become smaller than nor equal to the map rotational speed (S38: NO), the judging unit 25a directly returns the procedure.

When the vehicle speed V is not within a range of 55 km/h≦V≦65 km/h (S24: NO), or when the steering speed Vθ is not larger than nor equal to 800 deg/s (S25: NO), the judging unit 25a resets the timer 26 (S41) and returns the procedure.

When the flag F2 is not 0 (S20: NO), the judging unit 25a causes the motor rotational speed map 20a to hold the indicated rotational speed at the time (S30) and begins timing with the timer 26 (S31). When the flag F3 is not 0 (S21: NO), the judging unit 25a causes the motor rotational speed map 20a to decrease the indicated rotational speed at the rate of 2000 rpm/s (S36), then reads indicated rotational speed and map rotational speed (S37) and judges whether the indicated rotational speed has lowered and become smaller than or equal to the map rotational speed or not (S38).

Figure 7:
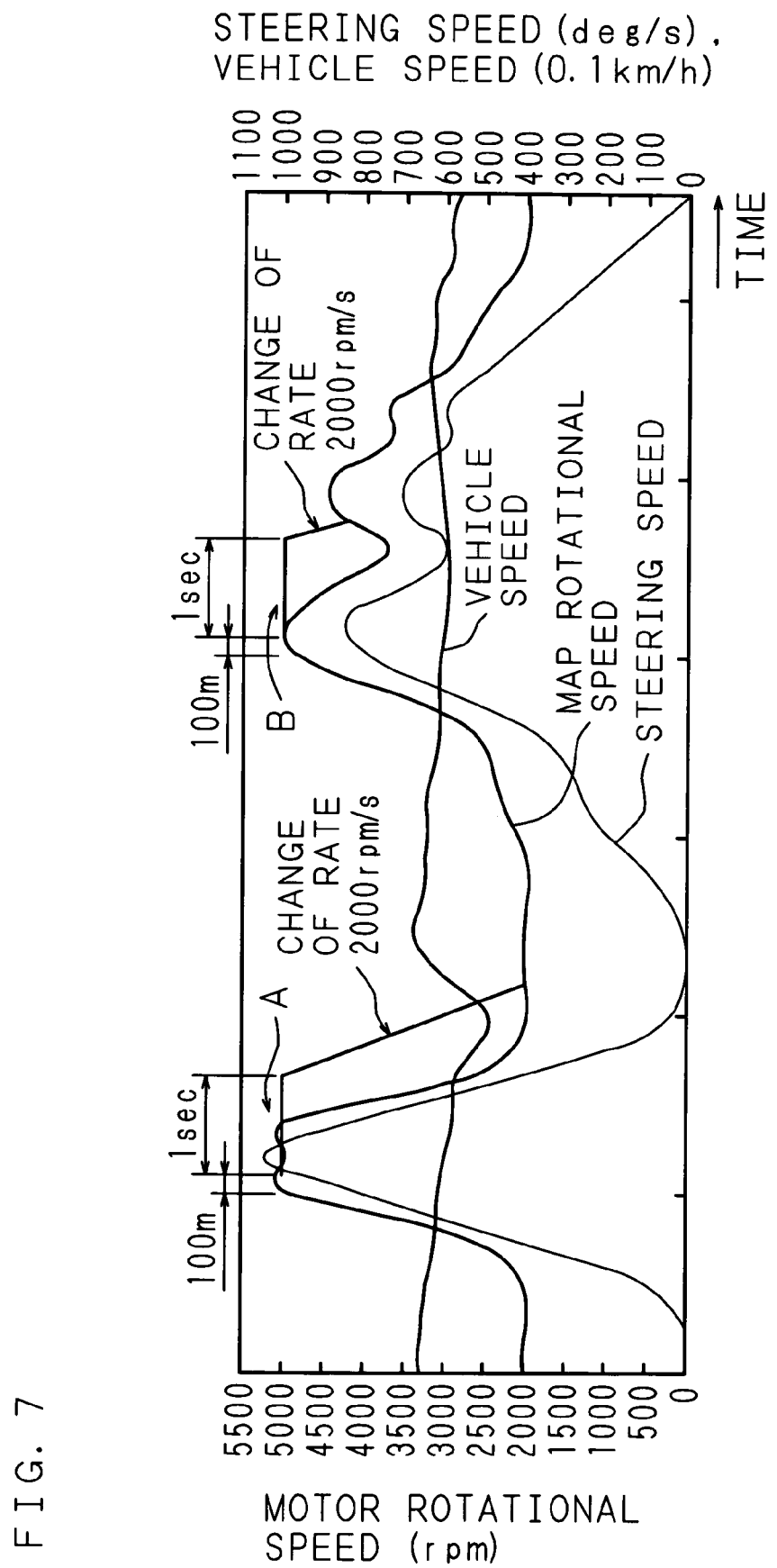
FIG. 7 is a graph showing an example of an operation of a power steering apparatus according to the present invention.

With the above structure, this power steering apparatus holds indicated rotational speed at the time for 1 second in a case where 100 millisecond passes while vehicle speed V is within a range of 55 km/h≦V≦65 km/h and steering speed Vθ is larger than or equal to 800 deg/s as shown by A and B in a graph of FIG. 7 for showing an example of operation of the power steering apparatus. The power steering apparatus then decreases the indicated rotational speed at the rate of 2000 rpm/s, and causes the indicated rotational speed to conform to the map rotational speed when the indicated rotational speed has lowered and become smaller than or equal to the map rotational speed.

(Disclosure 1)

Figure 8:
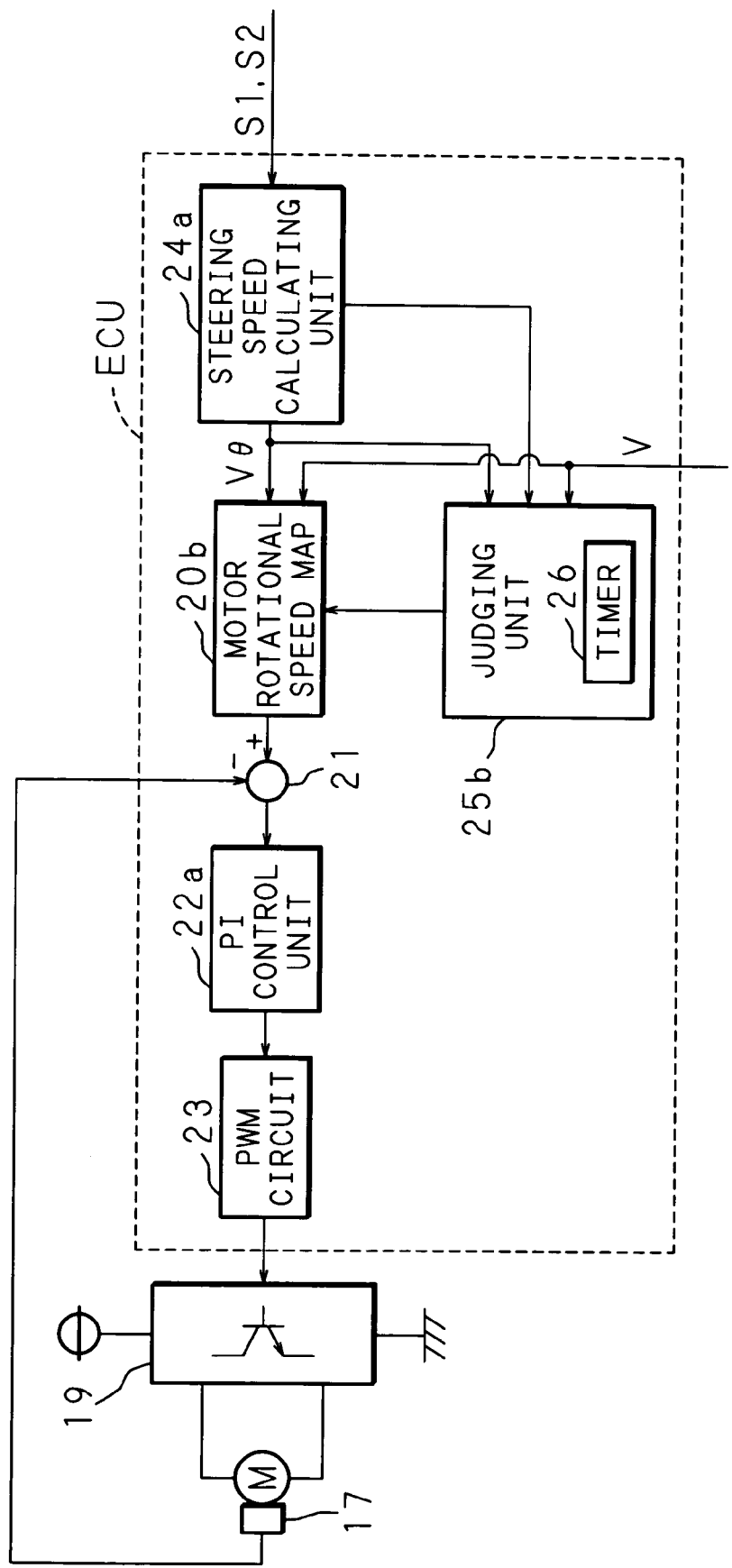
FIG. 8 is a block diagram showing an example of the structure of an electronic control unit, a drive circuit, an electric motor and a rotational speed sensor of a power steering apparatus to be disclosed.

FIG. 8 is a block diagram showing an example of the structure of an electronic control unit, a drive circuit, an electric motor and a rotational speed sensor of a power steering apparatus to be disclosed. In an electronic control unit ECU, a steering speed calculating unit 24a which is supplied with edge signals S1 and S2 from a rotary encoder of a steering angle sensor 8 calculates steering speed on the basis of the given edge signals S1 and S2 and gives a steering speed (signal) Vθ thereof to a motor rotational speed map 20b and a judging unit 25b.

Figure 10:
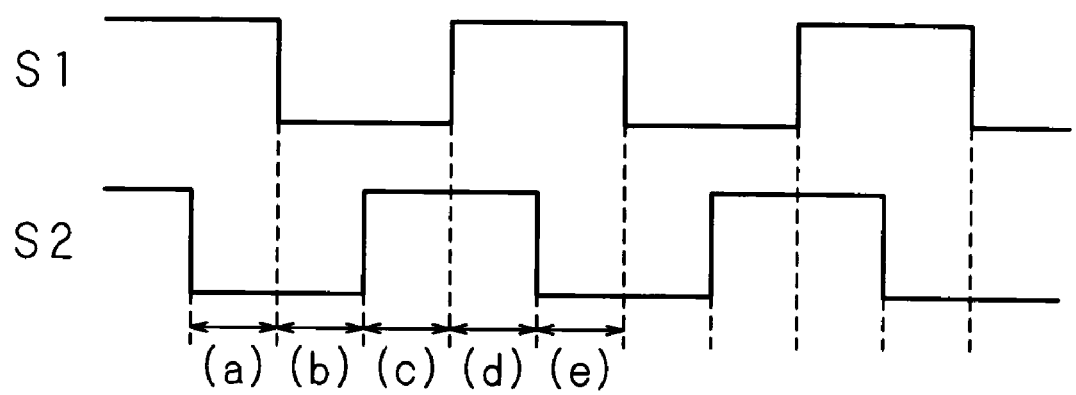
FIG. 10 is an explanatory view showing an edge signal of a rotary encoder.

The edge signals S1 and S2 are square wave signals having phases different from each other at 90 degrees as shown in an explanatory view of FIG. 10, and the steering speed calculating unit 24a counts (resolution of 1 millisecond, for example) edge-to-edge spacing (1.5 degrees as a steering angle, for example) between the edge signals S1 and S2 and divides a constant K by a counted value C thereof to figure out steering speed Vθ. Moreover, the steering direction is judged on the basis of which of the edge signals S1 and S2 (rise or fall) is inputted first.

The steering speed is calculated for every 4 edge-to-edge spacing, in particular, as a)b)c)d), b)c)d)e), c)d)e) . . . (FIG. 10).

$$\text{Steering speed} = (1.5 \times 4)/(C/1000) \text{ [deg/s]}$$
$$= 6000/C$$

Here, calculation is performed for a value obtained by multiplying the steering speed by 16 in order to reduce the truncation error in computing. Accordingly, the steering angle is figured out by dividing the constant K=96000 by the counted value C.

Steering speed $V\theta = 96000/C$

At the start of steering, the steering speed $V\theta$ is calculated using a value obtained by multiplying the count number A(n) of the edge-to-edge spacing by 4, upon detection of the second edge.

Steering speed $V\theta = 96000/(A(n) \times 4)$

Upon detection of the third edge, the steering speed $V\theta$ is calculated by the following formula:

Steering speed $V\theta = 96000/(A(n) \times 3 + A(n+1))$

Upon detection of the fourth edge, the steering speed $V\theta$ is calculated by the following formula:

Steering speed $V\theta = 96000/(A(n) \times 2 + A(n+1) + A(n+2))$

After detection of the fifth edge, the steering speed $V\theta$ is calculated by the following formula:

Steering speed $V\theta = 96000/(A(n) \times 2 + A(n+1) + A(n+2) + A(n+3))$

A vehicle speed signal V from a vehicle speed sensor 18 is given to the motor rotational speed map 20b and the judging unit 25b. The judging unit 25b is supplied with a notification signal when the steering speed calculating unit 24a detects the first edge or the second edge at the start of steering. Moreover, when a predetermined condition is met, the judging unit 25b supplies the motor rotational speed map 20b with a signal for increasing or decreasing the indicated rotational speed. Moreover, the judging unit 25b incorporates a timer 26.

The motor rotational speed map 20b, which has a map for defining the relation between the steering speed, the vehicle speed and the motor rotational speed as shown in FIG. 4, outputs indicated rotational speed (target rotational speed) to an electric motor M in accordance with the given steering speed signal $V\theta$ and vehicle speed signal V and gives the indicated rotational speed to a deviation computing unit 21.

Rotational speed detected by a rotational speed sensor 17 of the electric motor M is given to the deviation computing unit 21, and the deviation computing unit 21 subtracts the rotational speed from the indicated rotational speed to compute the deviation thereof and gives the computed deviation to a PI control unit 22a.

The PI control unit 22a computes a control signal for performing PI control on the basis of the given deviation and gives the computed control signal to a PWM circuit 23. Since other structures are the same as those of Embodiment 1 (FIGS. 1 and 2) of a power steering apparatus described above, like codes are used to refer to like parts and the explanation thereof is omitted.

Figure 9A:
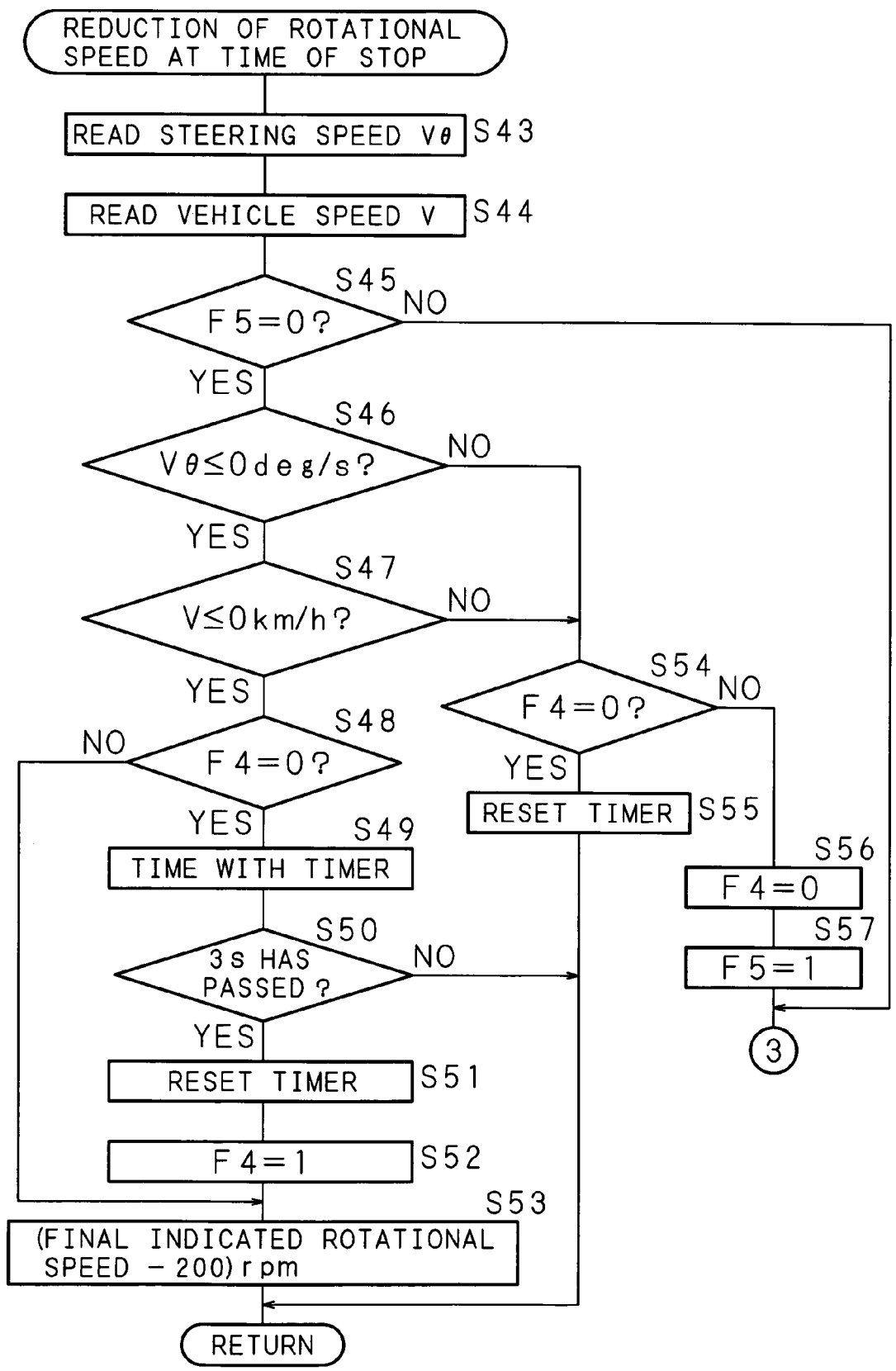
FIGS. 9A and 9B are flow charts showing an operation of reducing rotational speed of an electric motor of a power steering apparatus to be disclosed at the time of vehicle stop.
Figure 9B:
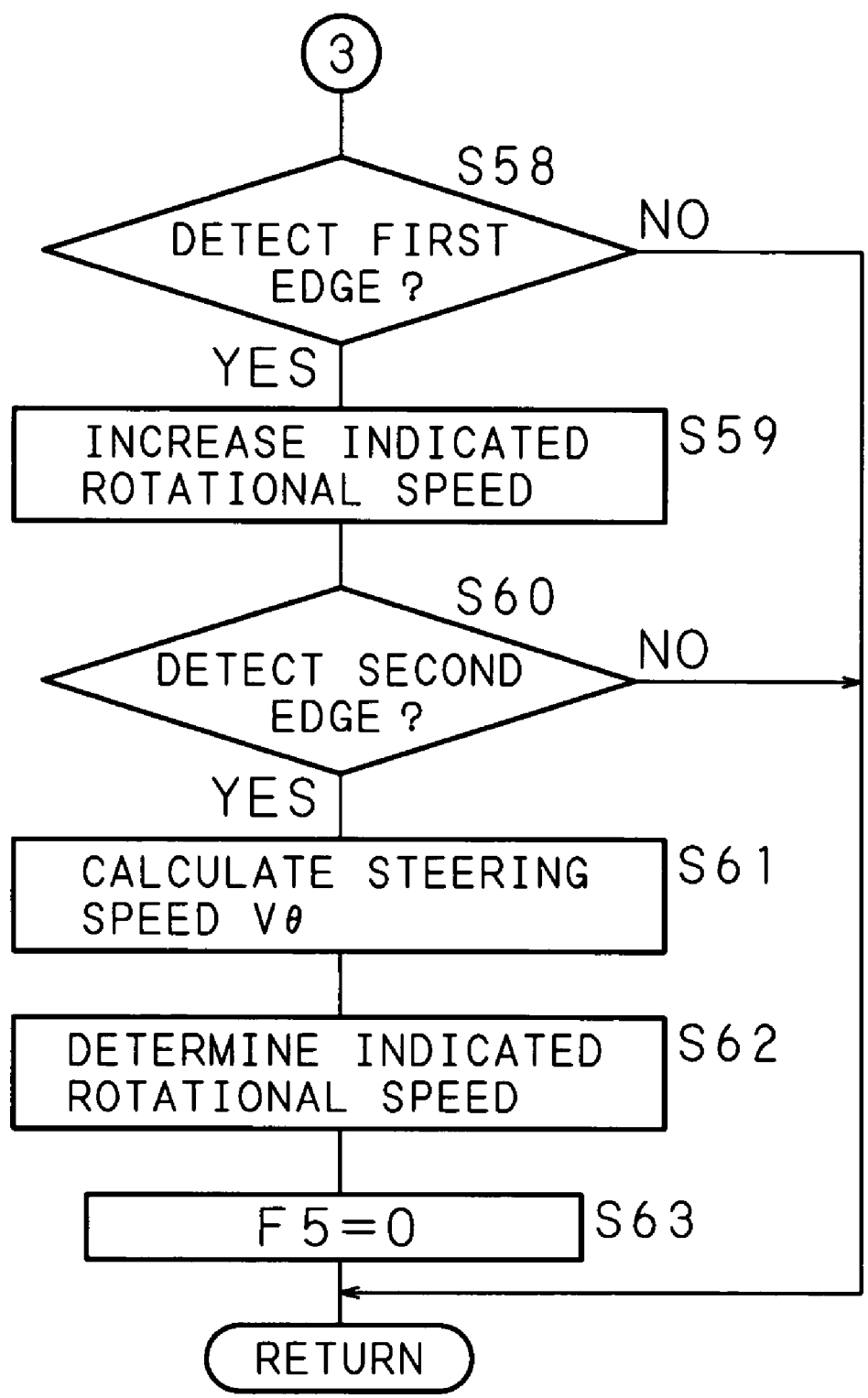

The following description will explain an operation of reducing the rotational speed of the electric motor M of a power steering apparatus constructed as described above at the time of vehicle stop with reference to flow charts in FIGS. 9A and 9B.

The judging unit 25b first reads a steering speed (signal) $V\theta$ from the steering speed calculating unit 24a (S43) and reads a vehicle speed (signal) V from the vehicle speed sensor 18 (S44). The judging unit 25b then judges whether a flag F5 is 0 or not (S45), and when the flag F5 is 0 (S45: YES), the judging unit 25b judges whether the steering speed $V\theta$ is, for example, smaller than or equal to 0 deg/s or not (S46).

When the steering speed $V\theta$ is smaller than or equal to 0 deg/s (S46: YES), the judging unit 25b judges whether the vehicle speed V is, for example, smaller than or equal to 0 km/h or not (S47), and when the vehicle speed V is smaller than or equal to 0 km/h (S47: YES), the judging unit 25b judges whether a flag F4 is 0 or not (S48). When the flag F4 is 0 (S48: YES), the judging unit 25b begins timing with the timer 26 (S49) and then judges whether 3 second has passed or not (S50). When 3 second has passed (S50: YES), the judging unit 25b resets the timer 26 (S51), then sets the flag F4 to 1 (S52), causes the motor rotational speed map 20b to output indicated rotational speed obtained by subtracting 200 rpm from indicated rotational speed (final indicated rotational speed) at the time (S53) and returns the procedure. When 3 second has not passed (S50: NO), the judging unit 25b directly returns the procedure.

When the steering speed $V\theta$ is not smaller than nor equal to 0 deg/s (S46: NO), or when the vehicle speed V is not smaller than nor equal to 0 km/h (S47: NO), the judging unit 25b judges whether the flag F4 is 0 or not (S54), and when the flag F4 is 0 (S54: YES), the judging unit 25b resets the timer 26 (S55) and returns the procedure. When the flag F4 is not 0 (S54: NO), the judging unit 25b sets the flag F4 to 0 (S56), sets the flag F5 to 1 (S57) and then judges whether a notification signal at the time of detection of the first edge by the steering speed calculating unit 24a is obtained or not (S58).

When a notification signal at the time of detection of the first edge is obtained (S58: YES), the judging unit 25b causes the motor rotational speed map 20b to increase the indicated rotational speed (S59) and then judges whether a notification signal at the time of detection of the second edge by the steering speed calculating unit 24a is obtained or not (S60). When a notification signal at the time of detection of the second edge is obtained (S60: YES), the steering speed calculating unit 24a calculates the steering speed $V\theta$ (S61), the motor rotational speed map 20b determines and outputs indicated rotational speed based on the steering speed $V\theta$ (S62) and the judging unit 25b sets the flag F5 to 0 (S63) and returns the procedure.

When no notification signal at the time of detection of the first edge is obtained (S58: NO), or when no notification signal at the time of detection of the second edge is obtained (S60: NO), the judging unit 25b directly returns the procedure.

When the flag F5 is not 0 (S45: NO), the judging unit 25b judges whether a notification signal at the time of detection of the first edge by the steering speed calculating unit 24a is obtained or not (S58). When the flag F4 is not 0 (S48: NO), the judging unit 25b causes the motor rotational speed map 20b to output indicated rotational speed obtained by subtracting 200 rpm from final indicated rotational speed at the time (S53) and returns the procedure.

(Disclosure 2)

Figure 11:
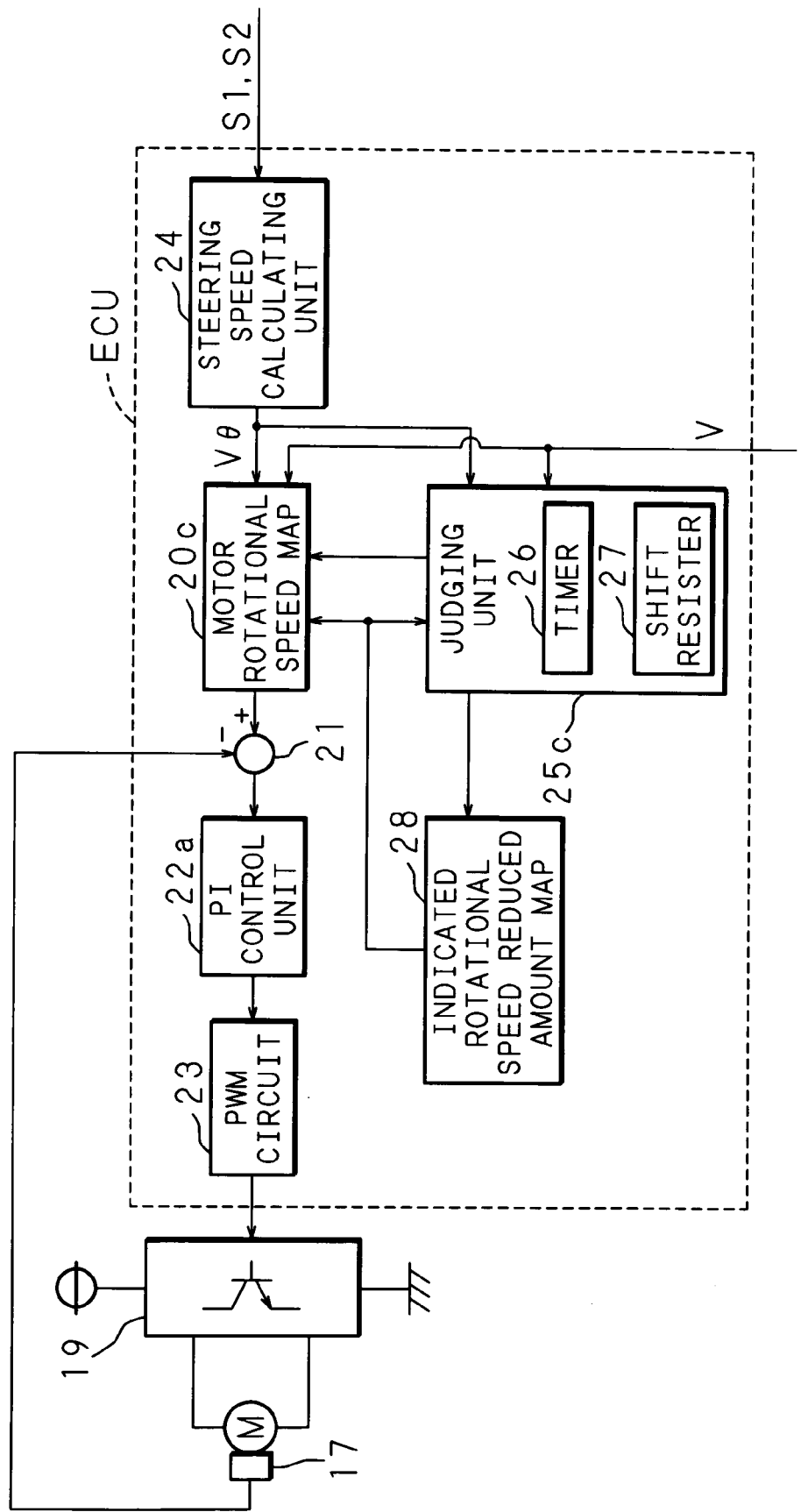
FIG. 11 is a block diagram showing an example of the structure of an electronic control unit, a drive circuit, an electric motor and a rotational speed sensor of a power steering apparatus to be disclosed.

FIG. 11 is a block diagram showing an example of the structure of an electronic control unit, a drive circuit, an electric motor and a rotational speed sensor of a power steering apparatus to be disclosed. In an electronic control unit ECU, a steering speed calculating unit 24 which is supplied with edge signals S1 and S2 from a rotary encoder of a steering angle sensor 8 calculates steering speed on the basis of the given edge signals S1 and S2 and gives a steering speed (signal) V$\theta$ thereof to a motor rotational speed map 20c and a judging unit 25c.

A vehicle speed signal V from a vehicle speed sensor 18 is given to the motor rotational speed map 20c and the judging unit 25c. When a predetermined condition is met, the judging unit 25c supplies the motor rotational speed map 20c with a signal for increasing or decreasing the indicated rotational speed. Moreover, the judging unit 25c incorporates a timer 26 and a shift resister 27 capable of storing 21 vehicle speed signals V, i.e. V0-V20.

Figure 13:
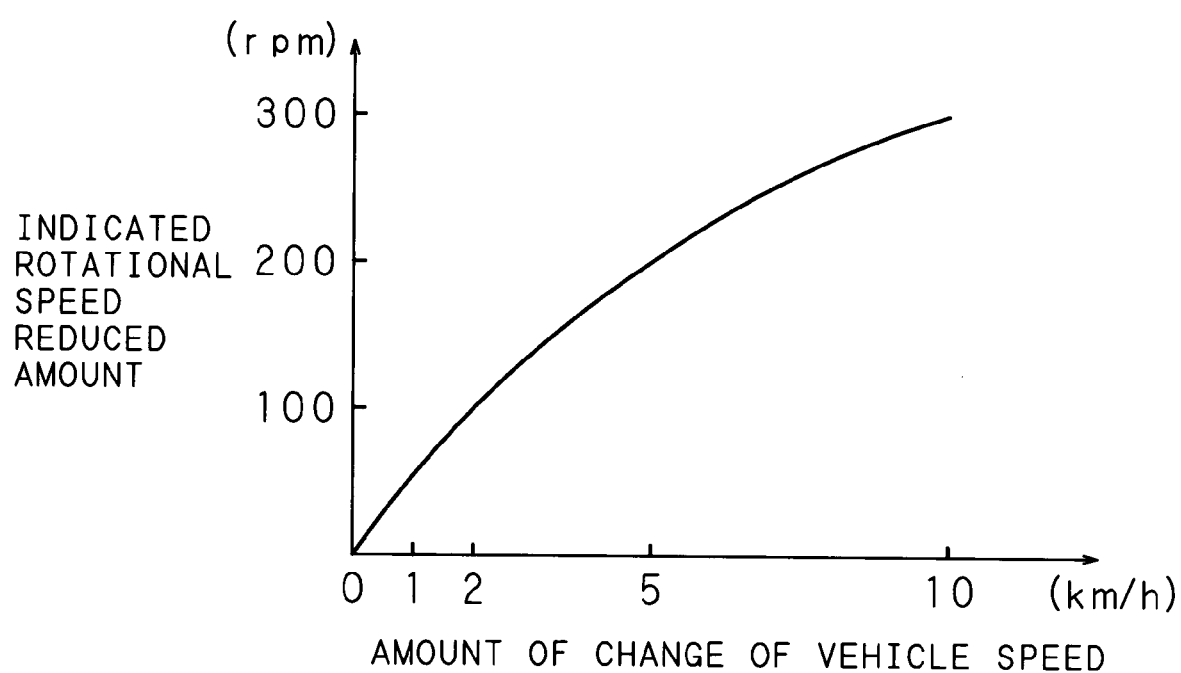
FIG. 13 is a characteristic view showing an example of an indicated rotational speed reduced amount map.

An electronic control unit ECU comprises an indicated rotational speed reduced amount map 28 constructed as shown in FIG. 13, which defines the amount of reduction of the indicated rotational speed outputted from the motor rotational speed map 20c in accordance with the amount of change of the vehicle speed from the judging unit 25c when the judging unit 25c judges that a predetermined condition is met.

Rotational speed detected by a rotational speed sensor 17 of the electric motor M is given to a deviation computing unit 21, and the deviation computing unit 21 subtracts the rotational speed from indicated rotational speed to compute a deviation thereof and gives the computed deviation to a PI control unit 22a.

The PI control unit 22a computes a control signal for performing PI control on the basis of the given deviation and gives the computed control signal to a PWM circuit 23. Since other structures are the same as those of Embodiment 1 (FIGS. 1 and 2) of a power steering apparatus described above, like codes are used to refer to like parts and the explanation thereof is omitted.

Figure 12A:
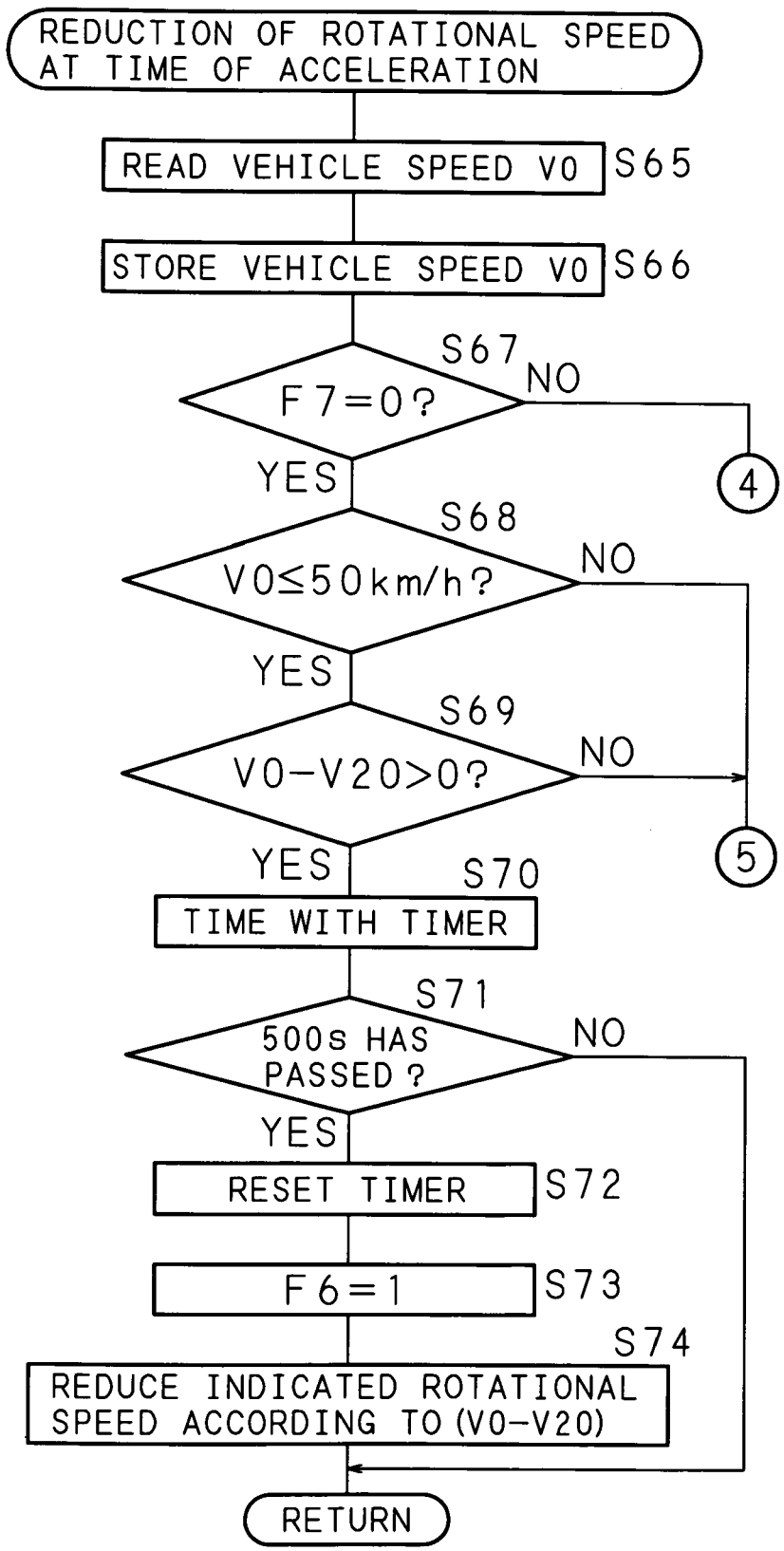
FIGS. 12A and 12B are flow charts showing an operation of reducing rotational speed of an electric motor of a power steering apparatus to be disclosed at the time of acceleration of a vehicle.
Figure 12B:
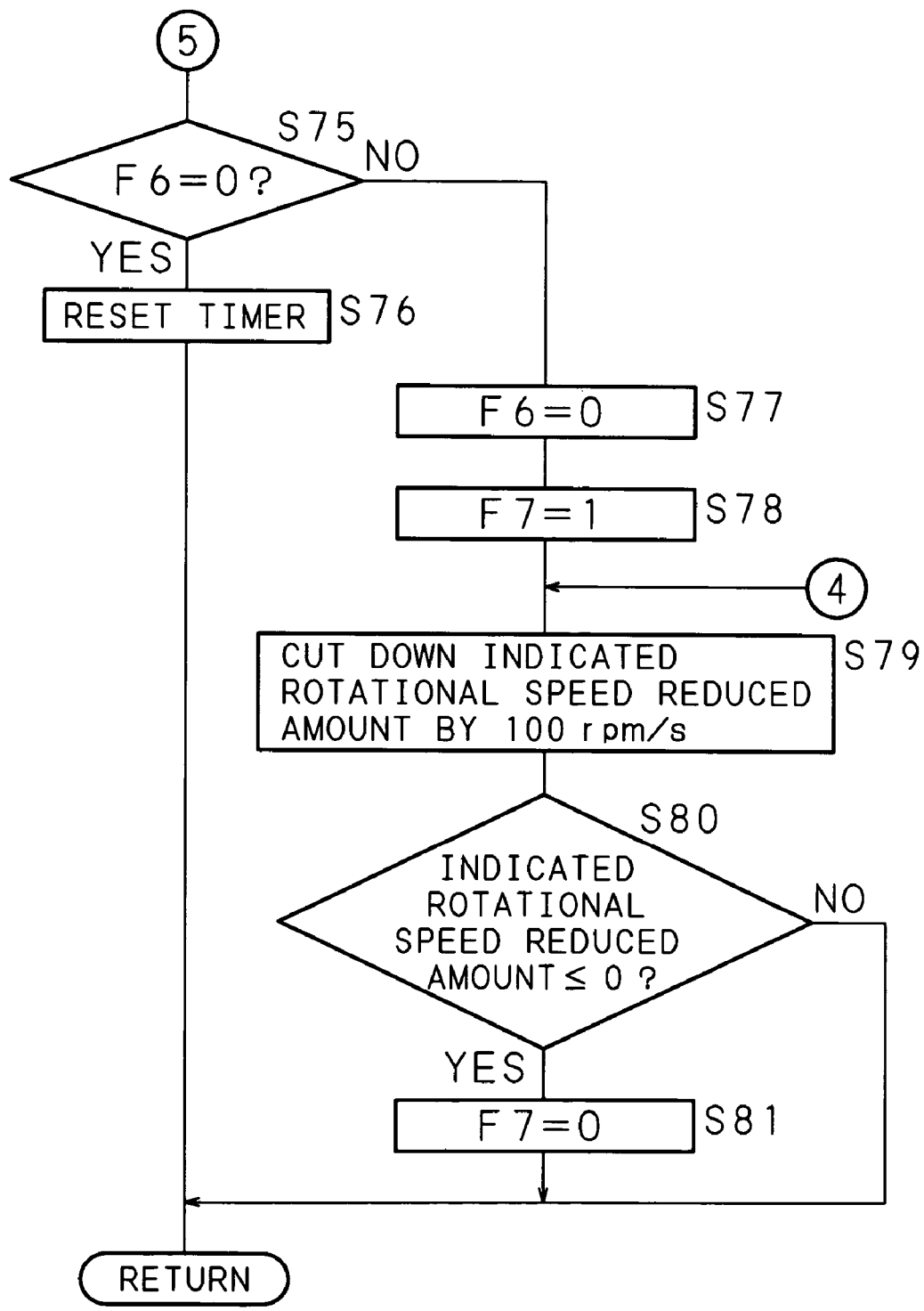

The following description will explain an operation of reducing the rotational speed of the electric motor M of a power steering apparatus constructed as described above at the time of acceleration of a vehicle with reference to flow charts in FIGS. 12A and 12B.

The judging unit 25c first reads a vehicle speed (signal) V0 from the vehicle speed sensor 18 (S65) and stores the read vehicle speed V0 in the shift resister 27 (S66). The judging unit 25c then judges whether a flag F7 is 0 or not (S67), and when the flag F7 is 0 (S67: YES), the judging unit 25c judges whether the vehicle speed V0 is, for example, smaller than or equal to 50 km/h or not (S68). When the vehicle speed V0 is smaller than or equal to 50 km/h (S68: YES), the judging unit 25c calculates a difference between the vehicle speed V0 stored in the shift resister 27 and vehicle speed V20 at the time of 20 sampling times before and judges whether the difference is larger than 0 or not (S69).

When the difference between the vehicle speed V0 and the vehicle speed V20 is larger than 0 (S69: YES), the judging unit 25c begins timing with the timer 26 (S70) and then judges whether 500 millisecond has passed or not (S71). When 500 millisecond has passed (S71: YES), the judging unit 25c resets the timer 26 (S72) and then sets the flag F6 to 1 (S73). The judging unit 25c then causes the indicated rotational speed reduced amount map 28 to determine an indicated rotational speed reduced amount according to the difference (S69) between the vehicle speed V0 and the vehicle speed V20, causes the motor rotational speed map 20c to output indicated rotational speed obtained by subtracting the indicated rotational speed reduced amount (S74) and returns the procedure. When 500 millisecond has not passed (S71: NO), the judging unit 25c directly returns the procedure.

When the vehicle speed V0 is not smaller than nor equal to 50 km/h (S68: NO), or when the difference between the vehicle speed V0 and the vehicle speed V20 is not larger than 0 (S69: NO), the judging unit 25c judges whether the flag F6 is 0 or not (S75), and when the flag F6 is 0 (S75: YES), the judging unit 25c resets the timer 26 (S76) and returns the procedure. When the flag F6 is not 0 (S75: NO), the judging unit 25c sets the flag F6 to 0 (S77), sets the flag F7 to 1 (S78), then cuts down the indicated rotational speed reduced amount (S74) previously determined by the indicated rotational speed reduced amount map 28 by 100 rpm/s (S79) and judges whether an indicated rotational speed reduced amount after cut-down has become smaller than or equal to 0 or not (S80).

When the indicated rotational speed reduced amount after cut-down has become smaller than or equal to 0 (S80: YES), the judging unit 25c sets the flag F7 to 0 (S81) and returns the procedure. When the indicated rotational speed reduced amount after cut-down has not become smaller than nor equal to 0 (S80: NO), the judging unit 25c directly returns the procedure.

When the flag F7 is not 0 (S67: NO), the judging unit 25c cuts down the indicated rotational speed reduced amount (S74) previously determined by the indicated rotational speed reduced amount map 28 by 100 rpm/s (S79) and judges whether an indicated rotational speed reduced amount after cut-down has become smaller than or equal to 0 or not (S80).

With the above structure, this power steering apparatus causes the indicated rotational speed reduced amount map 28 to determine an indicated rotational speed reduced amount according to the difference between the vehicle speed V0 and the vehicle speed V20 when 500 millisecond passes while the vehicle speed V0 is, for example, smaller than or equal to 50 km/h and the difference between the vehicle speed V0 and the vehicle speed V20 at the time of 20 sampling times before is larger than 0. The motor rotational speed map 20c outputs indicated rotational speed obtained by subtracting the indicated rotational speed reduced amount.

That is, since the center of gravity moves backward at the time of acceleration of a vehicle and the load on the front wheel is decreased, a torque required for steering lowers and it is possible to reduce the steering assistance force by just that much and to cut down the power consumption.

When the above condition is not met, the motor rotational speed map 20c cuts down the indicated rotational speed reduced amount for subtraction of the indicated rotational speed (map indicated rotational speed) by 100 rpm/s for each sampling, and gets back to the normal operation when the indicated rotational speed reduced amount after cut-down becomes smaller than or equal to 0 in order to prevent rapid change of the steering assistance force.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A power steering apparatus comprising:
an oil pump for supplying a steering assist power cylinder with hydraulic fluid;
an electric motor for driving the oil pump;
a vehicle speed detecting unit for detecting vehicle speed;
a steering angle detecting unit for detecting a steering angle;
a rotational speed detecting unit for detecting rotational speed of the electric motor; and
a controller capable of performing operations of:
  calculating steering speed based on the steering angle detected by the steering angle detecting unit;
  calculating a rate of change of the calculated steering speed;
  judging whether the calculated rate of change is smaller than or equal to 0 or not; and
  reducing a gain of feedback control based on a deviation between a target rotational speed of the electric motor based on the vehicle speed detected by the vehicle speed detecting unit and on the calculated steering speed and the rotational speed detected by the rotational speed detecting unit, in comparison with a gain at time of judgment, when it is judged that the rate of change remains smaller than or equal to 0 for a predetermined time period, wherein
  rotation of the electric motor is controlled by the feedback control to assist steering with oil pressure generated by the oil pump, and
  the reduced gain is kept until the deviation becomes larger than 0.

2. A power steering apparatus comprising:
an oil pump for supplying a steering assist power cylinder with hydraulic fluid;
an electric motor for driving the oil pump;
a vehicle speed detecting unit for detecting vehicle speed;
a steering angle detecting unit for detecting a steering angle; and
a controller capable of performing operations of:
  calculating steering speed based on the steering angle detected by the steering angle detecting unit;
  judging whether the calculated steering speed is larger than or equal to a predetermined value or not; and
  holding a target rotational speed of the electric motor based on the vehicle speed detected by the vehicle speed detecting unit and on the calculated steering speed at time of judgment, when it is judged that the steering speed remains larger than or equal to the predetermined value for a first time period, wherein
  rotation of the electric motor is controlled using the target rotational speed of the electric motor to assist steering with oil pressure generated by the oil pump, and
  the target rotational speed of the electric motor is held for a second time period which is longer than the first time period.

3. A power steering apparatus comprising:
an oil pump for supplying a steering assist power cylinder with hydraulic fluid;
an electric motor for driving the oil pump;
vehicle speed detecting means for detecting vehicle speed;
steering speed detecting means for detecting steering speed;
rotational speed detecting means for detecting rotational speed of the electric motor:
calculating means for calculating a rate of change of the steering speed detected by the steering speed detecting means;
judging means for judging whether the rate of change calculated by the calculating means is smaller than or equal to 0 or not; and
gain reducing means for reducing a gain of feedback control based on a deviation between a target rotational speed of the electric motor based on the vehicle speed detected by the vehicle speed detecting means and on the steering speed detected by the steering speed detecting means and the rotational speed detected by the rotational speed detecting means, in comparison with a gain at time of judgment, when the judging means judges that the rate of change remains smaller than or equal to 0 for a predetermined time period, wherein
rotation of the electric motor is controlled by the feedback control to assist steering with oil pressure generated by the oil pump, and
the gain reducing means keeps the reduced gain until the deviation becomes larger than 0.

4. A power steering apparatus comprising:
an oil pump for supplying a steering assist power cylinder with hydraulic fluid;
an electric motor for driving the oil pump;
vehicle speed detecting means for detecting vehicle speed;
steering speed detecting means for detecting steering speed;
judging means for judging whether the steering speed is larger than or equal to a predetermined value or not; and
holding means for holding a target rotational speed of the electric motor based on the vehicle speed detected by the vehicle speed detecting means and on the steering speed detected by the steering speed detecting means at time of judgment, when the judging means judges that the steering speed remains larger than or equal to the predetermined value for a first time period, wherein
rotation of the electric motor is controlled using the target rotational speed of the electric motor to assist steering with oil pressure generated by the oil pump, and
the holding means holds the target rotational speed of the electric motor for a second time period which is longer than the first time period.

* * * * *

UNITED STATES PATENT AND TRADEMARK OFFICE
CERTIFICATE OF CORRECTION

| | | |
|---|---|---|
| PATENT NO. | : 7,363,134 B2 | Page 1 of 1 |
| APPLICATION NO. | : 11/141930 | |
| DATED | : April 22, 2008 | |
| INVENTOR(S) | : Takashi Mitsuhara | |

It is certified that error appears in the above-identified patent and that said Letters Patent is hereby corrected as shown below:

Title Page item 73

Please insert --JTEKT Corporation, Osaka, Japan--

Signed and Sealed this

Ninth Day of December, 2008

JON W. DUDAS
*Director of the United States Patent and Trademark Office*